United States Patent
Ku et al.

(10) Patent No.: US 8,289,208 B2
(45) Date of Patent: Oct. 16, 2012

(54) DEVICE FOR TRACKING POLARIZATION

(75) Inventors: Bon-Jun Ku, Daejon (KR); Do-Seob Ahn, Daejon (KR); Ho-Jin Lee, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 351 days.

(21) Appl. No.: 12/664,053

(22) PCT Filed: May 8, 2008

(86) PCT No.: PCT/KR2008/002580
§ 371 (c)(1),
(2), (4) Date: Dec. 10, 2009

(87) PCT Pub. No.: WO2008/153276
PCT Pub. Date: Dec. 18, 2008

(65) Prior Publication Data
US 2010/0164801 A1    Jul. 1, 2010

(30) Foreign Application Priority Data
Jun. 11, 2007 (KR) .......... 10-2007-0056626

(51) Int. Cl.
*H04B 7/185* (2006.01)
*H04B 1/00* (2006.01)
(52) U.S. Cl. .......... 342/361; 455/63.1; 342/358
(58) Field of Classification Search .......... 455/3.02, 455/427, 429, 12.1, 13.3, 25, 501, 63.1; 342/361, 342/358; 375/267
See application file for complete search history.

(56) References Cited

U.S. PATENT DOCUMENTS

| | | | |
|---|---|---|---|
| 5,530,452 A * | 6/1996 | Yokev et al. | 342/457 |
| 6,262,690 B1 * | 7/2001 | Malone et al. | 343/850 |
| 6,339,611 B1 * | 1/2002 | Antonio et al. | 375/130 |
| 7,310,379 B2 * | 12/2007 | Sibecas et al. | 375/267 |
| 7,596,354 B2 * | 9/2009 | Schiff | 455/63.4 |
| 7,969,357 B2 * | 6/2011 | Russo et al. | 342/361 |
| 2005/0227659 A1 | 10/2005 | Dybdal et al. | |
| 2007/0047678 A1 * | 3/2007 | Sibecas et al. | 375/343 |

FOREIGN PATENT DOCUMENTS

| | | |
|---|---|---|
| KR | 1994-0017324 A | 7/1994 |
| WO | WO-92/21162 A1 | 11/1992 |

OTHER PUBLICATIONS

Obeidat, B.A. et al., "Nonstationary Array Processing for Tracking Moving Targets with Time-Varying Polarizations", Acoustics, Speech, and Signal Processing, 2005. Proceedings. (ICASSP '05). IEEE International Conference on, vol. 4, Mar. 18-23, 2005, pp. IV-937-IV-940.

Nishiyama, E. et al., "Polarization Controlled Microstrip Antenna", Antennas and Propagation Society International Symposium, 2005 IEEE, vol. 1A, Jul. 3-8, 2005, pp. 68-71.

\* cited by examiner

*Primary Examiner* — Sonny Trinh
(74) *Attorney, Agent, or Firm* — Rabin & Berdo, P.C.

(57) ABSTRACT

Provided is a device for tracking polarizations. A receiving polarization tracking device includes a feeder for finding vertical and horizontal vector components by receiving vertical and horizontal polarizations, a polarization estimator for estimating distortion of polarizations using the vertical and horizontal vector components outputted from the feeder, a polarization controller for controlling amplitudes and phases of vertical and horizontal polarizations based on information about the estimated distortion from the polarization estimator and an output signal from the receiving polarization tracking device, and a combiner for combining the vertical and horizontal polarizations controlled from the polarization controller.

16 Claims, 4 Drawing Sheets

[Fig. 1]
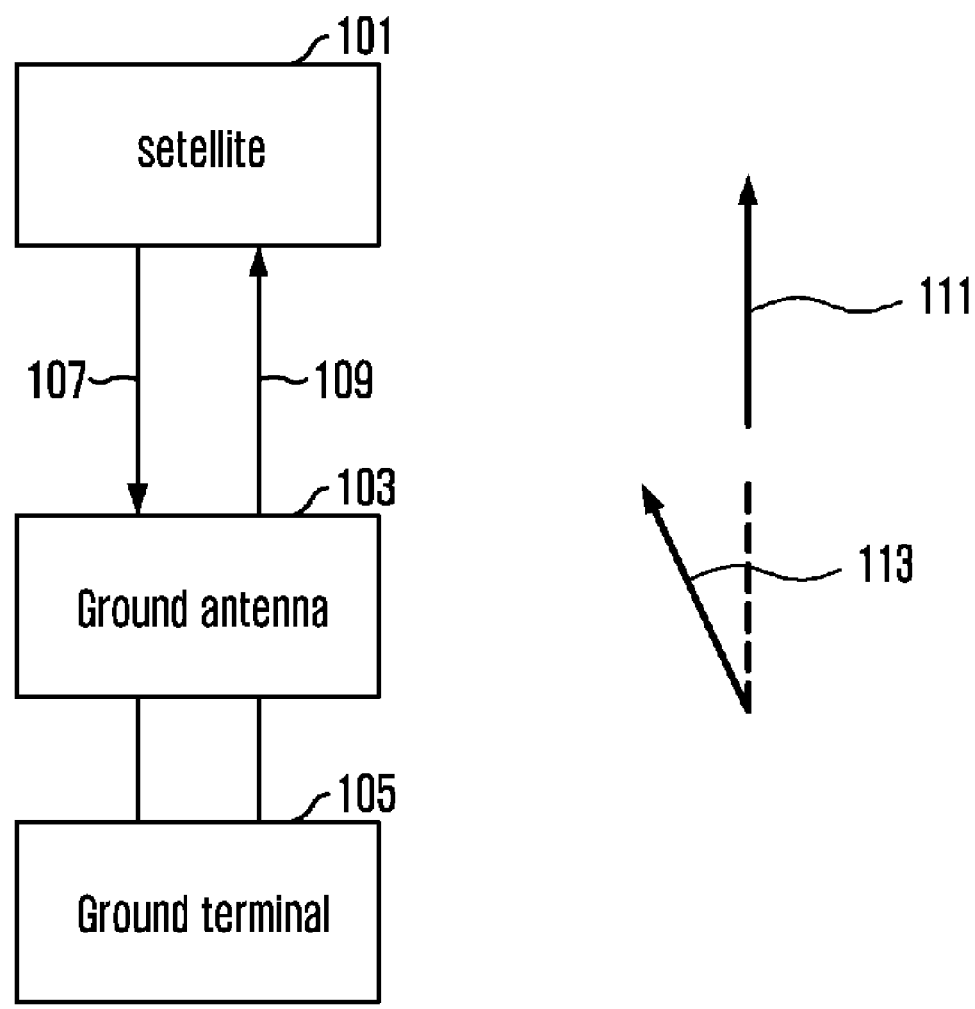

[Fig. 2]
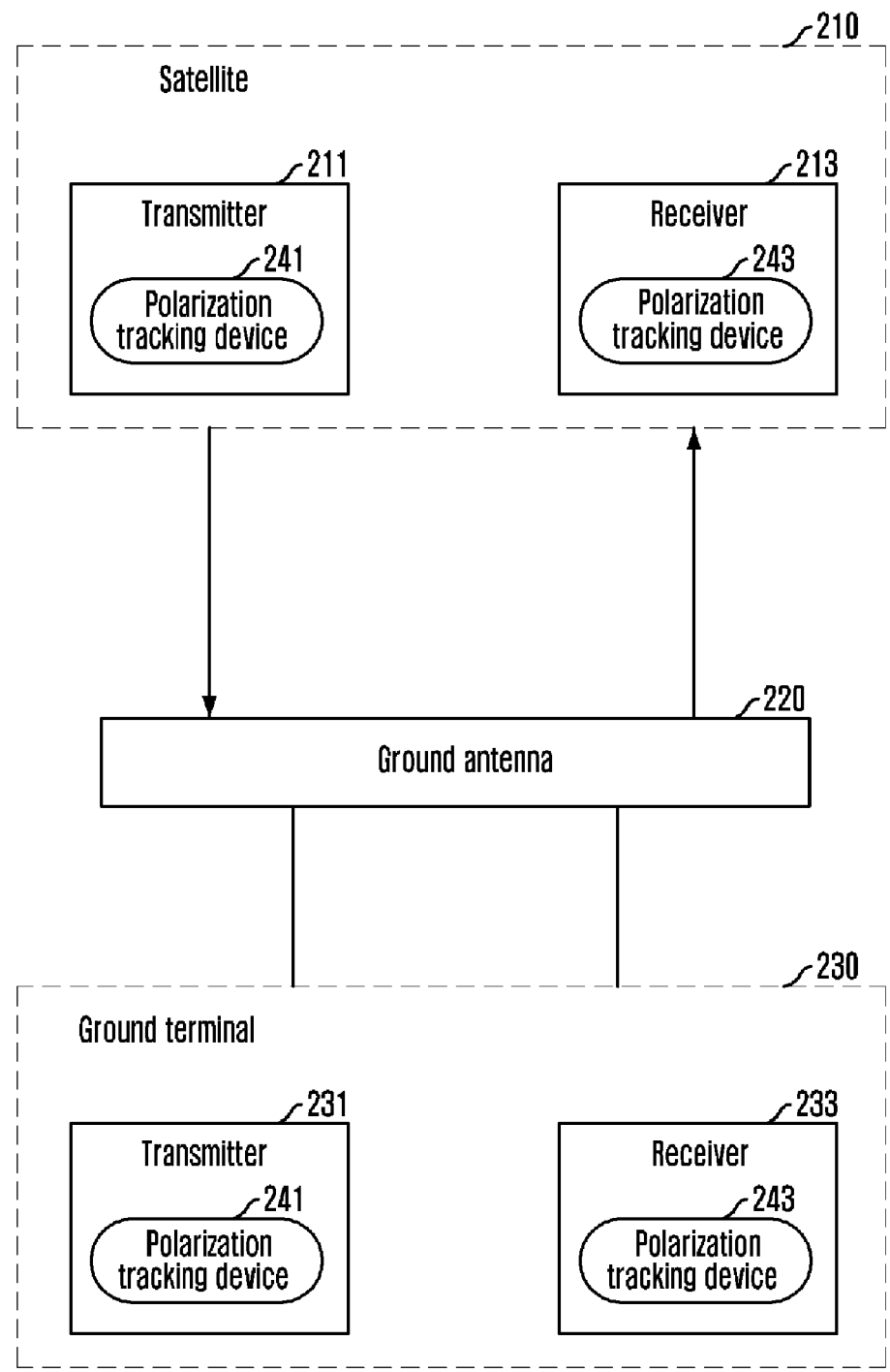

[Fig. 3]
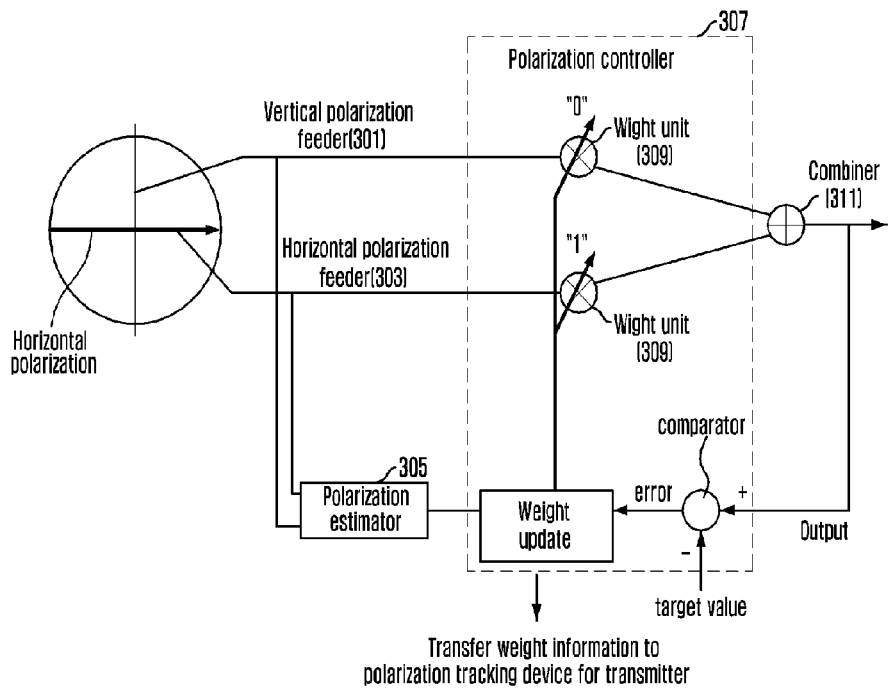
[Fig. 4]
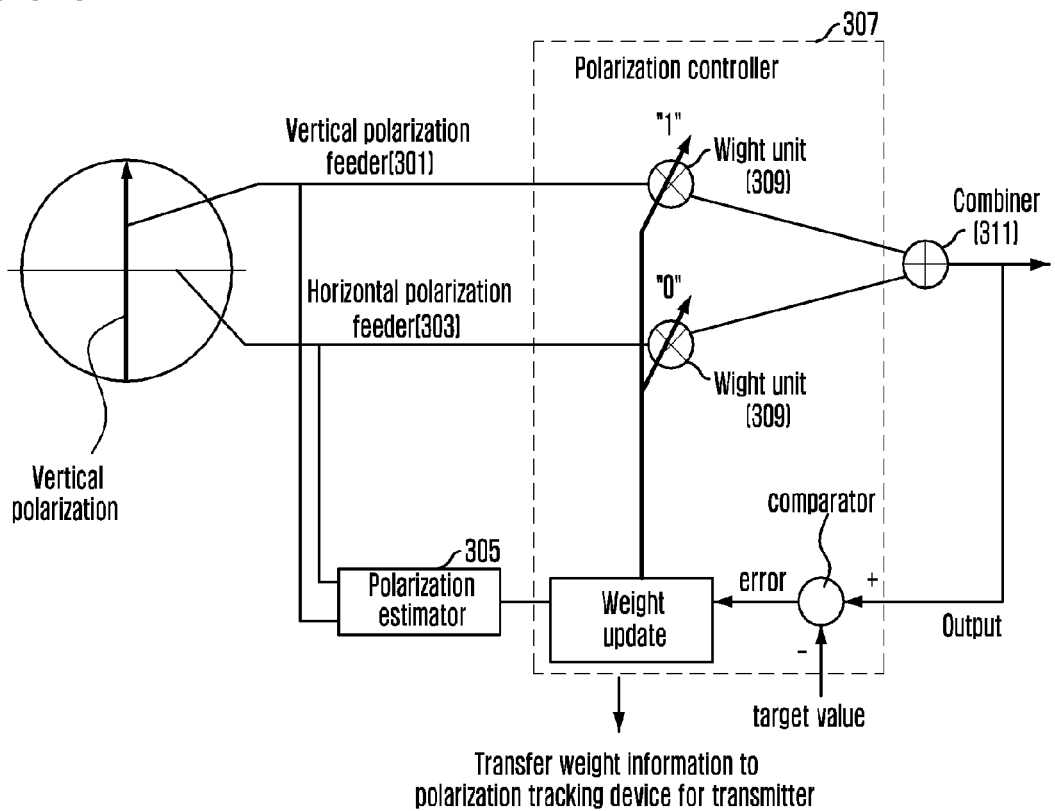

[Fig. 5]
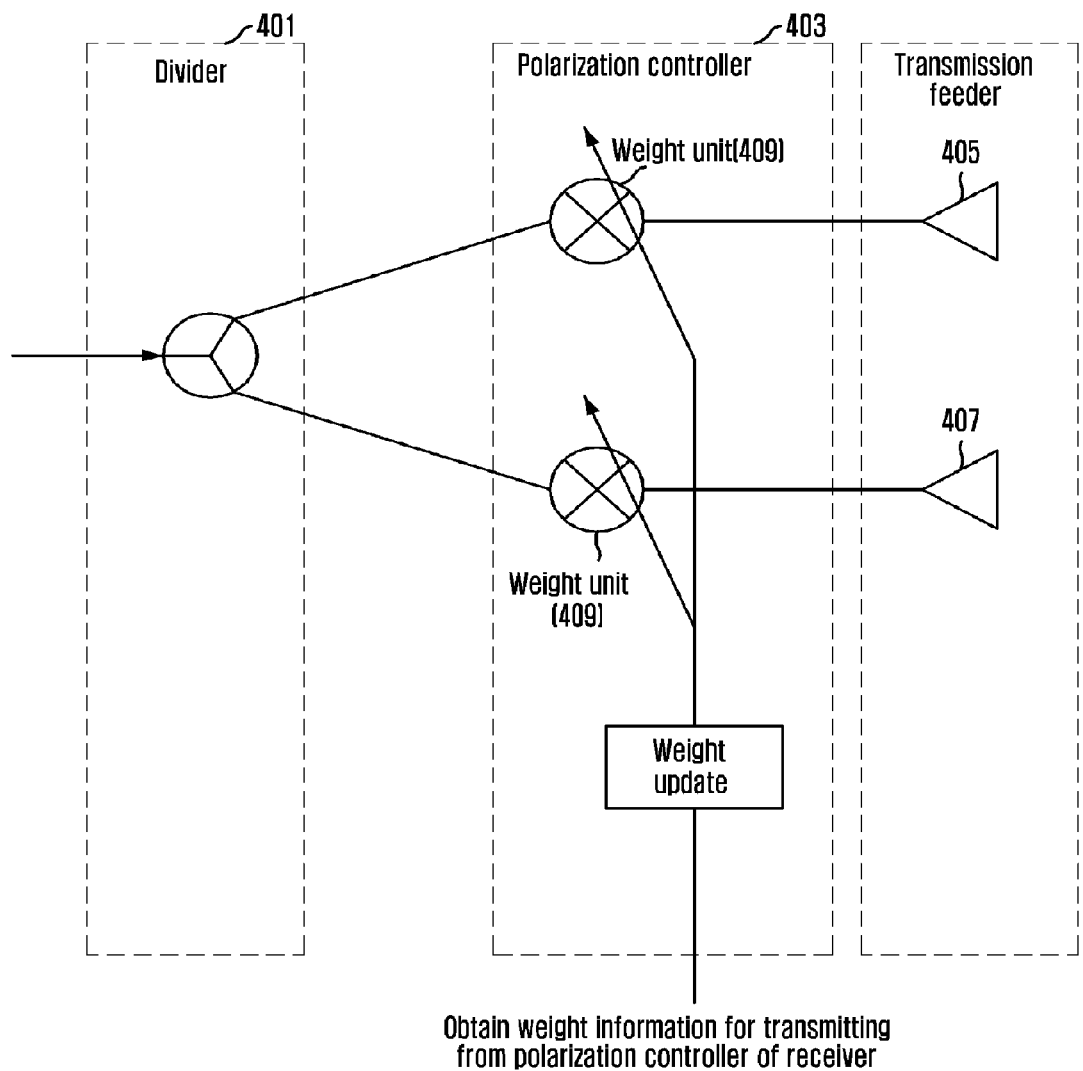

DEVICE FOR TRACKING POLARIZATION

TECHNICAL FIELD

The present invention relates to a device for tracking polarization; and, more particularly, to a device for tracking polarization in order to resolve polarization mismatch in a transmitter and a receiver in a wireless communication system.

This work was supported by the IT R&D program of MIC/IITA [2005-S-014-02, "Development of satellite IMT-2000+ technolog"].

BACKGROUND ART

Generally, a wireless communication system uses one of a vertical polarization signal, a horizontal polarization signal, and a circular polarization signal, or a multiple polarization signal to reduce interference between systems and to increase capacity of the same frequency band in a wireless communication system that provide a wireless communication service such as a ground wireless service and a satellite service.

FIG. 1 is a schematic diagram illustrating a wireless communication system transmitting and receiving a linear polarization signal according to the related art.

Referring to FIG. 1, the wireless communication system transmitting/receiving a linear polarization signal according to the related art includes a satellite 101, a ground terminal 105 for transmitting and receiving vertical or horizontal polarization signals, and a ground antenna 103 for transmitting and receiving polarization signals from the ground terminal 105.

In case of downlink 107, the satellite 101 transmits a linear polarization signal 111 and has limited transmission power not to give interference to the other satellite network or terrestrial network. If the transmission power of the satellite 101 is limited, a signal may be attenuated due to linear polarization distortion 113, thereby deteriorating system performance. For example, the ground terminal 105 capable of receiving a circular polarization signal receives a signal from the satellite with 50% power reduced when the ground terminal 105 receives a distorted linear polarization signal. That is, power reduction caused by linear polarization distortion may deteriorate overall system performance if the transmission power of the satellite 101 is limited.

In case of uplink 109, the ground terminal 105 transmits a linear polarization signal 113 and has limited transmission power not to give interference to the other satellite network or ground network. If the transmission power of the ground terminal is limited like the downlink 107, a signal is attenuated by polarization distortion, thereby deteriorating system performance.

As a technology using a polarization tracking device according to the related art, a technology for increasing a signal to noise ratio through removing cross-polarization components was introduced. A communication system using horizontal and vertical polarization can simultaneously transmit two channels without interference using the same frequency.

However, a polarization tracking apparatus, used in the described technology according to the related art, cannot control polarization that randomly varies due to environmental factors between a satellite and a ground terminal and posture variation according to movement of a ground terminal. Thus, it is difficult to receive a signal with no polarization distortion at a ground terminal. Due to such a reason, a horizontal (or vertical) polarization receiver receives a part of vertical (or horizontal) polarization component and has cross polarization components. Therefore, a signal quality of a desired channel is degraded.

As another technology using a polarization tracking device according to the related art, a technology for tracking an arrival direction of a transmission source using instantaneous of polarization changing in time was introduced. Here, a dual-polarized array element is used for receiving polarization changing in time.

However, such a technology according to the related art cannot control polarization changing randomly by environmental factors because it was introduced under assumptions that polarization linearly changes in time and the arrival direction of a transmission source also linearly changes in time.

Therefore, a transmitter or a receiver of a wireless communication system employs a device for estimating and controlling polarization in order to reduce signal attenuation by correcting polarization distortion in the receiver or the transmitter, which may occur due to environmental factors between a satellite and a ground terminal or posture variation according to the ground terminal.

As another technology according to the related art, two slots are disposed to cross each other in a microstrip antenna, and a diode is connected to the crossing thereof. Then, an angle of polarization is controlled by closing and opening the diode.

In this technology, it is impossible to control linear polarization distorted in a predetermined angle because only orthogonal polarization is possible.

As described above, the polarization tracking device according to the related art cannot control a polarization signal varying randomly in a predetermined direction due to transmission power limitation, environmental factors between communication systems, and posture variation, thereby causing signal attenuation.

DISCLOSURE OF INVENTION

Technical Problem

An embodiment of the present invention is directed to providing a polarization tracking device for resolving polarization mismatch caused by posture variation of a satellite or a ground terminal and environmental factors by estimating polarization using a receiving signal and tracking polarization by controlling an amplitude and a phase of a receiving signal based on the estimated polarization in a receiver and by tracking polarization of a signal transmitted from a satellite using a weight for controlling polarization, which is calculated by a receiver, at a transmitter.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a receiving polarization tracking device including: a feeder for finding vertical and horizontal vector components by receiving vertical and horizontal polarizations; a polarization estimator for estimating distortion of polarizations using the vertical and horizontal vector components outputted from the feeder; a polarization controller for controlling amplitudes and phases of vertical and horizontal polarizations based on information about the estimated distortion from the polarization estimator and an output signal from the receiving polarization tracking device; and a combiner for combining the vertical and horizontal polarizations controlled from the polarization controller.

In accordance with another aspect of the present invention, there is provided a transmitting polarization tracking device including: a divider for dividing a transmitting signal into horizontal and vertical vector components; a polarization controller for controlling an amplitude and a phase of a transmitting signal using the horizontal and vertical vector components from the divider and horizontal and vertical weights calculated from a receiving polarization tracking device; and a feeder for transmitting horizontal and vertical polarization signals outputted from the polarization controller.

Advantageous Effects

A device for tracking polarization according to the present invention estimates distortion of horizontal and vertical polarizations randomly changing in a predetermined direction and controlling the polarizations based on the estimated distortion. Therefore, the device for tracking polarization reduces signal attenuation caused by polarization mismatch at a transmitter and a receiver in a satellite or a ground terminal.

BRIEF DESCRIPTION OF THE DRAWINGS

FIG. 1 is a schematic diagram illustrating a wireless communication system transmitting and receiving a linear polarization signal according to the related art.

FIG. 2 is a schematic diagram illustrating a wireless communication system according to an embodiment of the present invention.

FIGS. 3 and 4 illustrate a receiving polarization tracking device shown in FIG. 2.

FIG. 5 is a diagram illustrating a transmitting polarization tracking device 241 shown in FIG. 2.

BEST MODE FOR CARRYING OUT THE INVENTION

The advantages, features and aspects of the invention will become apparent from the following description of the embodiments with reference to the accompanying drawings, which is set forth hereinafter.

FIG. 2 is a schematic diagram illustrating a wireless communication system according to an embodiment of the present invention.

As shown in FIG. 2, the wireless communication system according to the present embodiment includes a satellite 210, a ground antenna 220, and a ground system 230. The wireless communication system according to the present embodiment transmits and receives a linear polarization signal.

The ground system 230 includes a transmitter 231 and a receiver 233. The transmitter 231 includes a transmitting polarization tracking device 241 and the receiver 233 includes a receiving polarization tracking device 243. The satellite 210 includes a transmitter 211 and a receiver 213. The transmitter 211 includes a transmitting polarization tracking device 241 and the receiver 213 includes a receiving polarization tracking device 243. That is, both of the satellite 210 and the ground system 230 may have the transmitting polarization tracking device and the receiving polarization tracking device, or one of the satellite 210 and the ground system 230 may have the transmission polarization tracking device and the receiving polarization tracking device.

FIGS. 3 and 4 illustrate a receiving polarization tracking device 243 shown in FIG. 2.

As shown in FIGS. 3 and 4, the receiving polarization tracking device 243 includes vertical and horizontal feeders 301 and 303 for receiving vertical or horizontal polarization signal components, a polarization estimator 305 for estimating distortion of received polarizations, a polarization controller 307 having weight units 309 for controlling polarizations based on an output signal of the receiving polarization tracking device 243, and a combiner 311 for combining a vertical polarization and a horizontal polarization, which are controlled by the polarization controller.

The feeders 301 and 303 are formed of two dipoles or slots which cross each other. The feeders 301 and 303 find vertical or horizontal vector components of a linear polarization that randomly varies in a predetermined direction.

The polarization estimator 305 estimates distortion of polarization based on vertical and horizontal vector components of a received polarization signal. For example, the weight of vertical polarization is set as 0 and the weight of horizontal polarization is set as 1 when only a horizontal polarization is transmitted, as shown in FIG. 3. Or, the weight of a vertical polarization is set as 1 and the weight of horizontal polarization is set as 0 when a vertical polarization is only transmitted as shown in FIG. 4. Therefore, if a distorted linear polarization is transmitted due to environment factors, the distortion of the polarization is estimated by finding weights of a vertical polarization and a horizontal polarization using vectors of vertical and horizontal components.

Here, if only one of a vertical polarization and a horizontal polarization is transmitted, weights of a horizontal polarization and a vertical polarization are set as 0 for removing noise included in a transmitting polarization.

The polarization controller 307 controls amplitudes and phases of vertical and horizontal polarizations based on the estimated distortion of a polarization from the polarization estimator 305 and an output signal of the receiving polarization tracking device 243, thereby solving polarization mismatch. Therefore, the polarization controller 307 reduces attenuation of a polarization signal by correcting a polarization signal randomly varying in a predetermined direction.

That is, the polarization controller 307 calculates an error by comparing the output signal of the receiving polarization tracking device 243 with a target value and changes a weight in real time using the estimated distortion of a polarization from the polarization estimator 305 and the calculated error in order to make the calculated error minimum.

The weight units 309 generate a horizontal polarization signal and a vertical polarization signal by multiplying the controlled weights with received horizontal and vertical vector components. That is, the changed weights from the polarization controller 307 are the horizontal and vertical weights that make the error minimum.

The combiner 311 combines the horizontal polarization signal and the vertical polarization signal generated from the weight units 309.

Therefore, polarization mismatch is solved by providing weights that make an error between output information of the receiver and a target value minimum through changing the weights in real time.

FIG. 5 is a diagram illustrating a transmitting polarization tracking device 241 shown in FIG. 2.

Referring to FIG. 5, the transmitting polarization tracking device 241 includes a divider 401 for dividing a transmitting signal to a vertical vector and a horizontal vector for controlling horizontal polarization components and vertical polarization components, a polarization controller 403 having weight units 409 for controlling an amplitude and a phase of a transmitting signal, and feeders 405 and 407 for transmitting horizontal and vertical polarization signals.

The divider 401 divides a transmitting signal to horizontal and vertical vector components for controlling horizontal polarization and vertical polarization.

The polarization controller 403 controls an amplitude and a phase of a transmitting signal using weight information calculated by the polarization estimator 305 and the polarization controller 307 of the receiving polarization tracking device 243.

That is, the transmitting polarization tracking device 241 uses the weight calculated by the polarization controller 307 of the receiving polarization tracking device 243, which make the error minimum, to control polarization components. If it is assumed that the polarization tracking devices have the same transmitting and receiving environments, the weight calculated by the receiving polarization tracking device 243 includes information about polarization distorted by environmental factors between a satellite and a ground terminal. Therefore, the polarization controller 403 uses the weight to change horizontal and vertical weights to make an error minimum.

The weight units 409 generate horizontal and vertical polarization signals by multiplying horizontal and vertical weights obtained from the polarization controller 403 with horizontal and vertical vector components.

The feeders 405 and 407 transmit the horizontal and vertical polarization signals generated from the polarization controller 403.

As described above, the technology of the present invention can be realized as a program and stored in a computer-readable recording medium, such as CD-ROM, RAM, ROM, floppy disk, hard disk and magneto-optical disk. Since the process can be easily implemented by those skilled in the art of the present invention, further description will not be provided herein.

The present application contains subject matter related to Korean Patent Application No. 10-2007-0056626, filed in the Korean Intellectual Property Office on Jun. 11, 2007, the entire contents of which is incorporated herein by reference.

While the present invention has been described with respect to certain preferred embodiments, it will be apparent to those skilled in the art that various changes and modifications may be made without departing from the scope of the invention as defined in the following claims.

The invention claimed is:

1. A receiving polarization tracking device, comprising:
a feeder for finding vertical and horizontal vector components by receiving vertical and horizontal polarizations
a polarization estimator for estimating distortion of polarizations using the vertical and horizontal vector components outputted from the feeder;
a polarization controller for controlling amplitudes and phases of vertical and horizontal polarizations based on information about the estimated distortion from the polarization estimator and an output signal from the receiving polarization tracking device; and
a combiner for combining the vertical and horizontal polarizations controlled from the polarization controller.

2. The receiving polarization tracking device of claim 1, the feeder has a cross dipole structure or a cross slot structure for receiving vertical and horizontal polarization signals.

3. The receiving polarization tracking device of claim 1, wherein the polarization estimator estimates the distortion of polarizations by finding a vertical weight and a horizontal weight using the vertical and horizontal vector components output from the feeder.

4. The receiving polarization tracking device of claim 1, wherein the polarization controller calculates an error by comparing the output signal of the receiving polarization tracking device with a target value.

5. The receiving polarization tracking device of claim 4, wherein the polarization controller changes the vertical weight and the horizontal weight using information about the estimated distortion from the polarization estimator and the calculated error to make the calculated error minimum.

6. The receiving polarization tracking device of claim 5, wherein the polarization controller includes a weight unit for generating a vertical polarization signal and a horizontal polarization signal by multiplying a weight changed by the polarization controller with the vertical and horizontal vector components received through the feeder, where the weight changed by the polarization controller is vertical and horizontal weights that make an error minimum.

7. The receiving polarization tracking device of claim 1, wherein the receiving polarization tracking device is applied to a single antenna and all elements of an array antenna for tracking polarization.

8. The receiving polarization tracking device of claim 1, wherein the polarization tracking device tracks a polarization by directly applying an antenna capable of transmitting and receiving two polarizations instead of a feeder capable of receiving two polarizations.

9. The receiving polarization tracking device of claim 1, wherein the receiving polarization tracking device divides a receiving path into a horizontal path and a vertical path, estimates divided polarizations, controls amplitudes and phases of divided signals, and combines the divided signals so as to track polarizations at a receiver in not only a satellite and a ground terminal but also a wireless communication system.

10. A transmitting polarization tracking device, comprising:
a divider for dividing a transmitting signal into horizontal and vertical vector components;
a polarization controller for controlling amplitudes and phases of a transmitting signal using the horizontal and vertical vector components from the divider and horizontal and vertical weights calculated from a receiving polarization tracking device; and
a feeder for transmitting horizontal and vertical polarization signals outputted from the polarization controller.

11. A transmitting polarization tracking device, comprising:
a divider for dividing a transmitting signal into horizontal and vertical vector components;
a polarization controller for controlling amplitudes and phases of a transmitting signal using the horizontal and vertical vector components from the divider and horizontal and vertical weights calculated from a receiving polarization tracking device; and
a feeder for transmitting horizontal and vertical polarization signals outputted from the polarization controller
wherein the polarization controller includes a weight unit for changing horizontal and vertical weights using information about the weights calculated by a receiving polarization tracking device.

12. The transmitting polarization tracking device of claim 11, wherein the polarization controller generates horizontal and vertical polarization signals by multiplying the horizontal and vertical weights obtained from the weight unit with horizontal and vertical vector components of a transmitting signal.

13. The transmitting polarization tracking device of claim 11, wherein the feeder has a cross dipole structure or a cross slot structure capable of transmitting vertical and horizontal polarization signals.

14. The transmitting polarization tracking device of claim 11, wherein the transmitting polarization tracking device is applied to a single antenna and all elements of an array antenna for tracking polarization.

15. The transmitting polarization tracking device of claim 11, wherein the transmitting polarization tracking device tracks a polarization by directly applying an antenna capable of transmitting and receiving two polarizations instead of a feeder capable of transmitting two polarizations.

16. The transmitting polarization tracking device of claim 11, wherein the transmitting polarization tracking device divides a transmitting path into a horizontal path and a vertical path, estimates divided polarizations, controls amplitudes and phases of divided signals, and combines the divided signals so as to track polarizations at a transmitter in not only a satellite and a ground terminal but also a wireless communication system.

* * * * *